(12) United States Patent
Panetta et al.

(10) Patent No.: US 9,396,531 B2
(45) Date of Patent: Jul. 19, 2016

(54) SYSTEMS AND METHODS FOR IMAGE AND VIDEO SIGNAL MEASUREMENT

(71) Applicant: Tufts University, Boston, MA (US)

(72) Inventors: Karen Panetta, Rockport, MA (US); Sos Agaian, San Antonio, TX (US); Chen Gao, King Of Prussia, PA (US)

(73) Assignees: Tufts University, Boston, MA (US); The Board of Regents of The University of Texas System, Austin, TX (US)

( * ) Notice: Subject to any disclaimer, the term of this patent is extended or adjusted under 35 U.S.C. 154(b) by 0 days.

(21) Appl. No.: 14/578,775

(22) Filed: Dec. 22, 2014

(65) Prior Publication Data
US 2015/0243041 A1    Aug. 27, 2015

Related U.S. Application Data

(60) Provisional application No. 61/920,293, filed on Dec. 23, 2013, provisional application No. 61/976,306, filed on Apr. 7, 2014.

(51) Int. Cl.
| G06K 9/34 | (2006.01) |
| G06T 7/00 | (2006.01) |
| G01J 3/46 | (2006.01) |
| G06F 17/30 | (2006.01) |
| H04N 5/208 | (2006.01) |
| H04N 9/64 | (2006.01) |

(52) U.S. Cl.
CPC .............. *G06T 7/0002* (2013.01); *G01J 3/46* (2013.01); *G06F 17/30244* (2013.01); *H04N 5/208* (2013.01); *H04N 9/646* (2013.01); *G06T 2207/10024* (2013.01); *G06T 2207/20021* (2013.01); *G06T 2207/20081* (2013.01); *G06T 2207/30168* (2013.01)

(58) Field of Classification Search
USPC ......... 382/164, 162, 173, 175, 176, 228, 218, 382/312; 345/603, 604; 348/180, E17; 358/1.15, 1.16, 1.2, 500
See application file for complete search history.

(56) References Cited

U.S. PATENT DOCUMENTS

| 6,577,764 | B2 * | 6/2003 | Myler | G06T 7/0004 348/180 |
| 6,636,635 | B2 * | 10/2003 | Matsugu | G06K 9/20 382/218 |
| 6,993,184 | B2 * | 1/2006 | Matsugu | G06K 9/20 382/173 |
| 7,990,569 | B2 * | 8/2011 | Hino | H04N 1/00347 358/1.15 |

* cited by examiner

*Primary Examiner* — Anh Do
(74) *Attorney, Agent, or Firm* — Ropes & Gray LLP

(57) ABSTRACT

An image/video may be analyzed to determine quality of its attributes, including local, global and pixel colorfulness, sharpness, and contrast to obtain an image quality measure. Invented quality may be obtained for captured images or videos and compared to a database or reference value of quality measures to identify quality of products, component anomalies, and product matches.

10 Claims, 14 Drawing Sheets

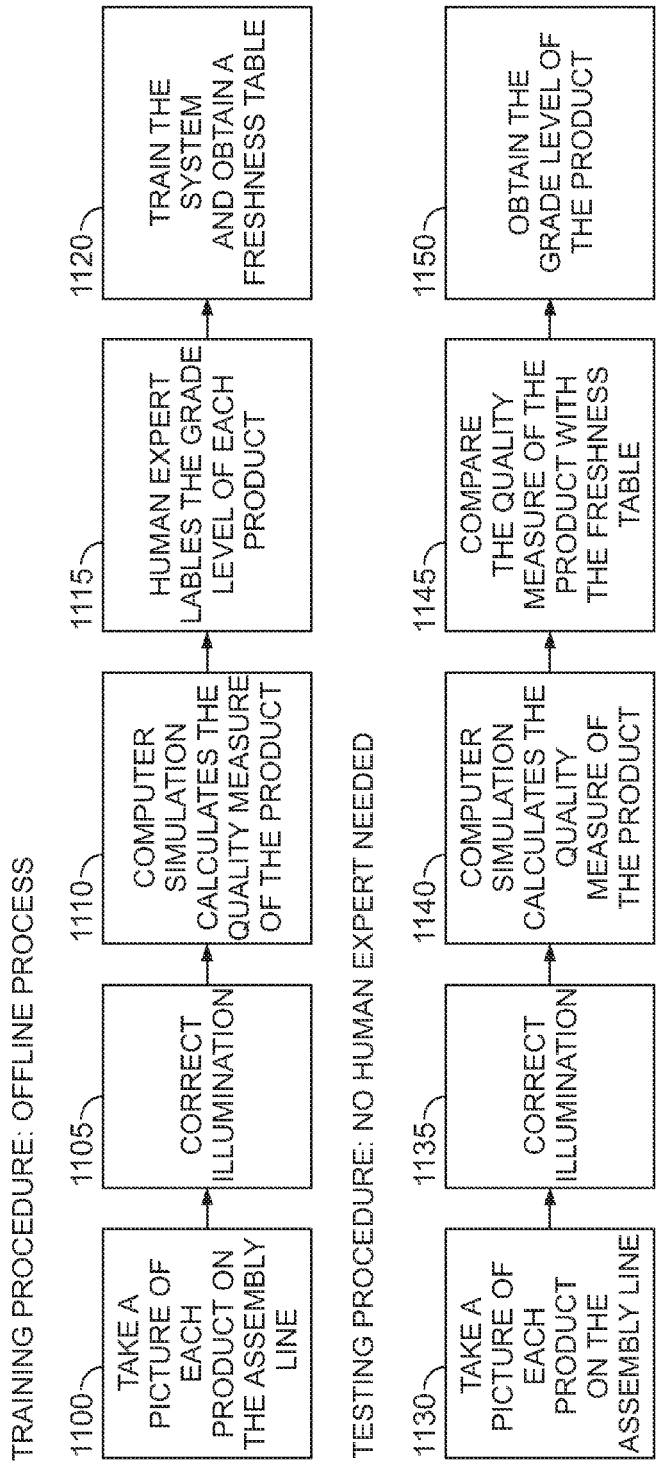
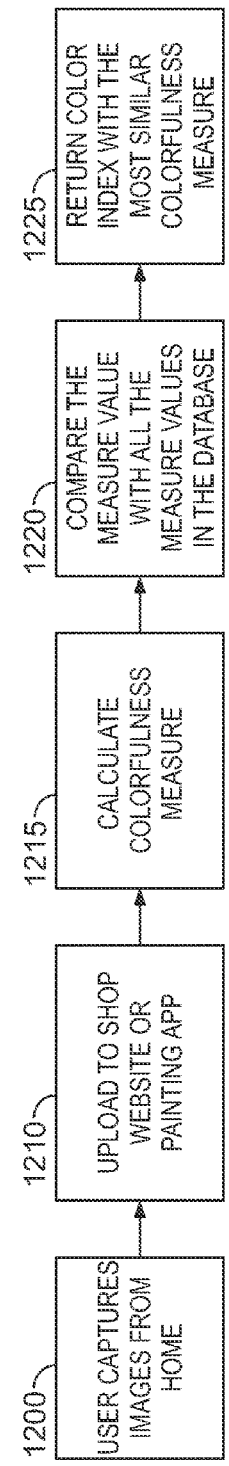
FIG. 11
FIG. 12

SYSTEMS AND METHODS FOR IMAGE AND VIDEO SIGNAL MEASUREMENT

CROSS REFERENCE TO RELATED APPLICATIONS

This application claims priority to U.S. Provisional Application Ser. No. 61/920,293 filed Dec. 23, 2013, entitled "Systems and Methods for Image and Video Signal Measurement," and U.S. Provisional Application Ser. No. 61/976,306, filed Apr. 7, 2014, entitled "Systems and Methods for Image and Video Signal Measurement," the entire contents of each are hereby incorporated by reference.

FIELD OF THE INVENTION

The systems and methods described herein relate to automated image quality evaluation, and, more particularly, to measuring color image or video frame quality by combining, pixel level, regional and global attributes such as the degree of difference between a color and gray (colorfulness), unicolor colorfulness, sharpness and contrast.

INTRODUCTION

Measuring color image quality is important for image processing and computer vision tasks, such as remote sensing, medical imaging, consumer application, computer and robotic vision, and handwriting recognition. The most widely recognized method of determining color image quality is the subjective evaluation Mean Opinion Score (MOS), but subjective evaluation is time-consuming and thus inappropriate for many applications. Some methods make an objective image quality measurement by comparing an image to a reference image, but such methods may be stymied when no reference image is available for comparison. No-reference objective image quality metrics generally fail to correlate with human visual perception, which depends on the illumination environment, the characteristics of the perceiving eye and brain, exposure parameters, and image acquisition and processing systems. Accordingly, there is a need to measure color image quality in an objective fashion that is robust to lighting and distortion conditions, is correlated with human perception, is independent of image distortion, and can be implemented in real-time.

SUMMARY

The systems and methods described herein use color image attributes, such as colorfulness (function of brightness and saturation), sharpness, contrast, or other suitable attributes, to allow real-time assessments of color images. These assessments may be distortion independent, correlated with human perception, and/or robust to lighting conditions. These assessments may be used to optimize image processing algorithms, to search for images in an image database, to assess product freshness or quality, or in other suitable systems.

LIST OF FIGURES

The foregoing and other objects, features, advantages, and illustrative embodiments of the invention will now be described with reference to the following drawings in which like reference designations refer to the same parts throughout the different views. These drawings are not necessarily to scale, emphasis instead being placed upon illustrating principles of the invention.

Figure 6A:
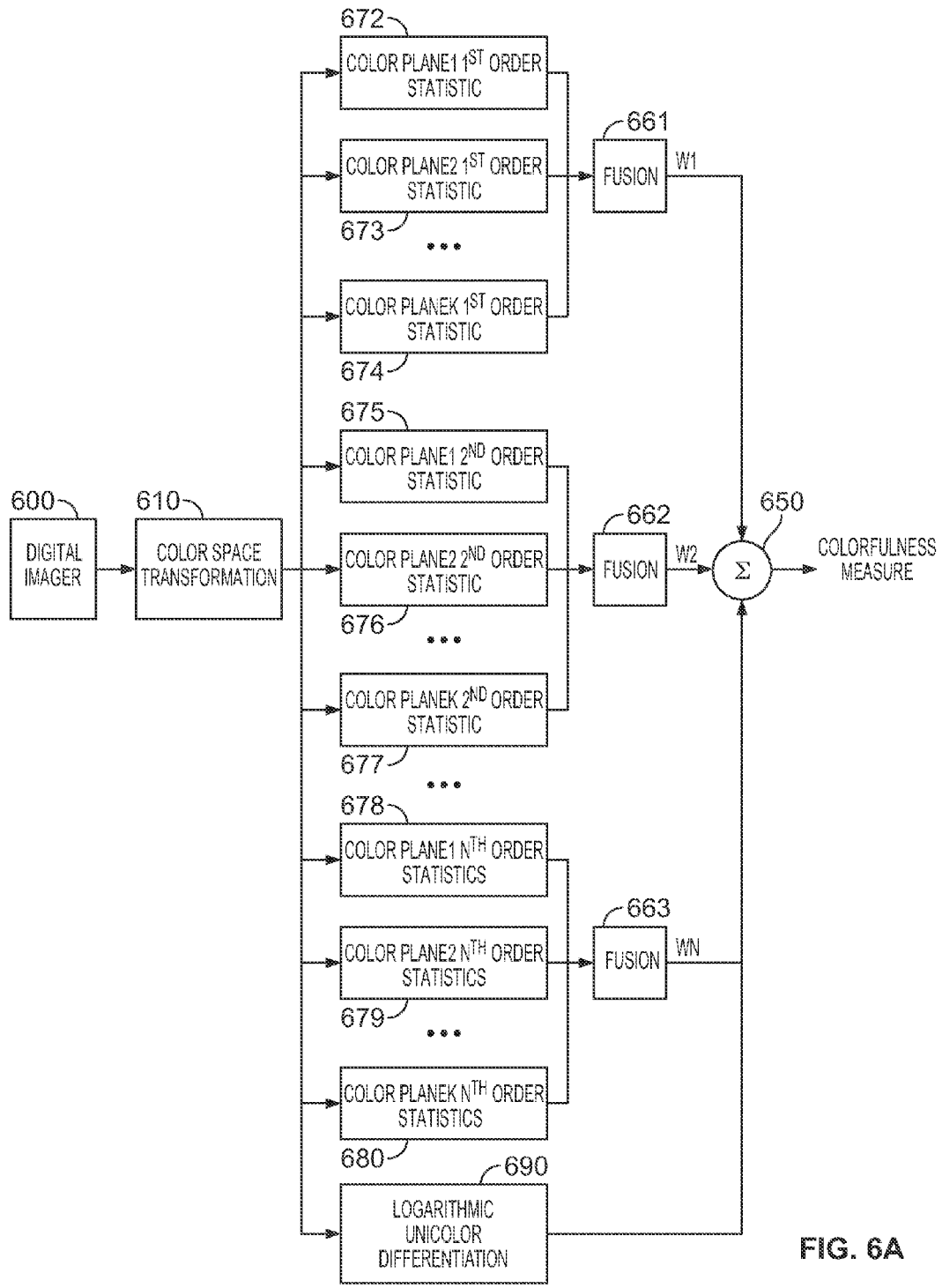
Figure 6B:
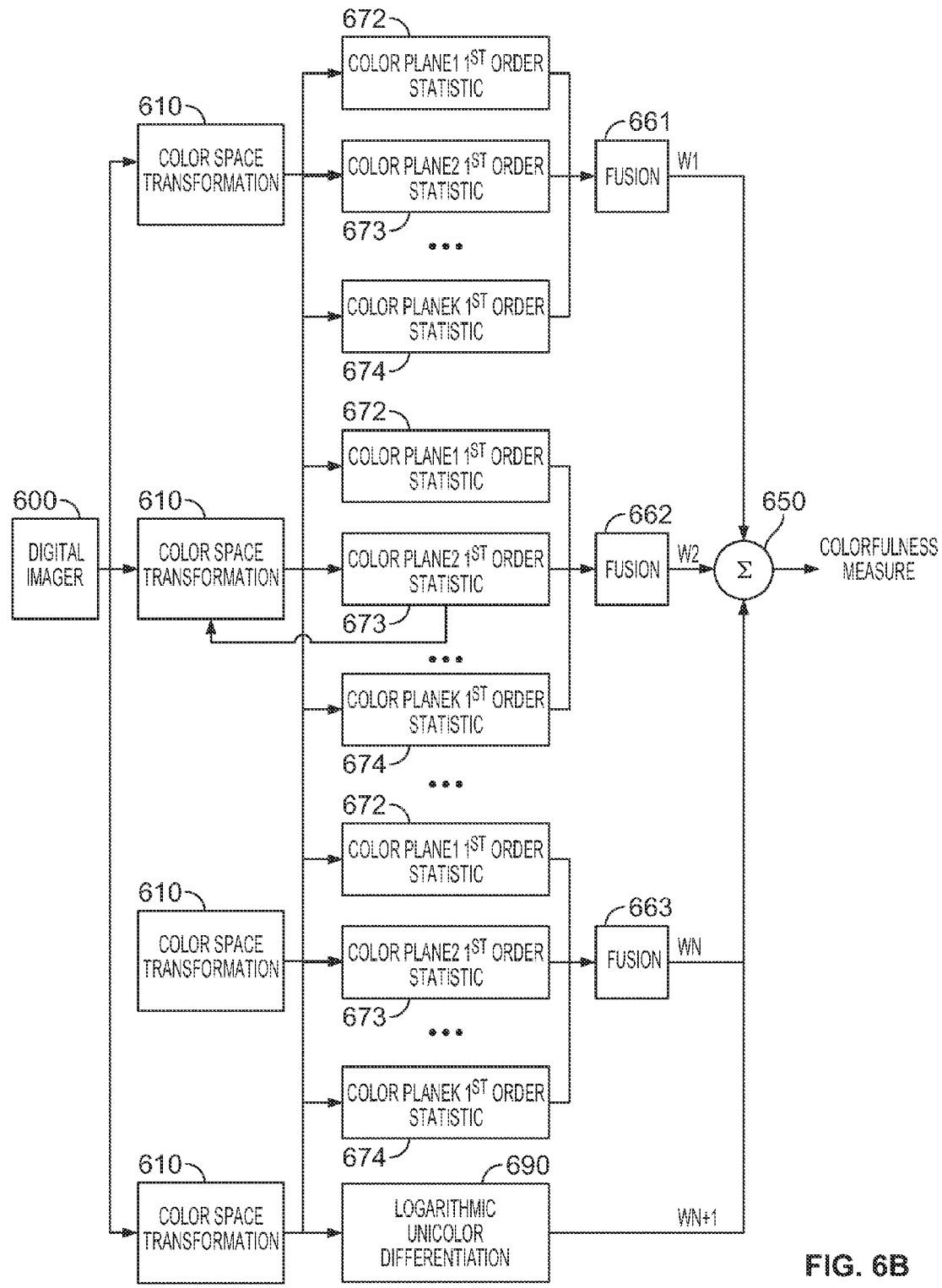
Figure 7:
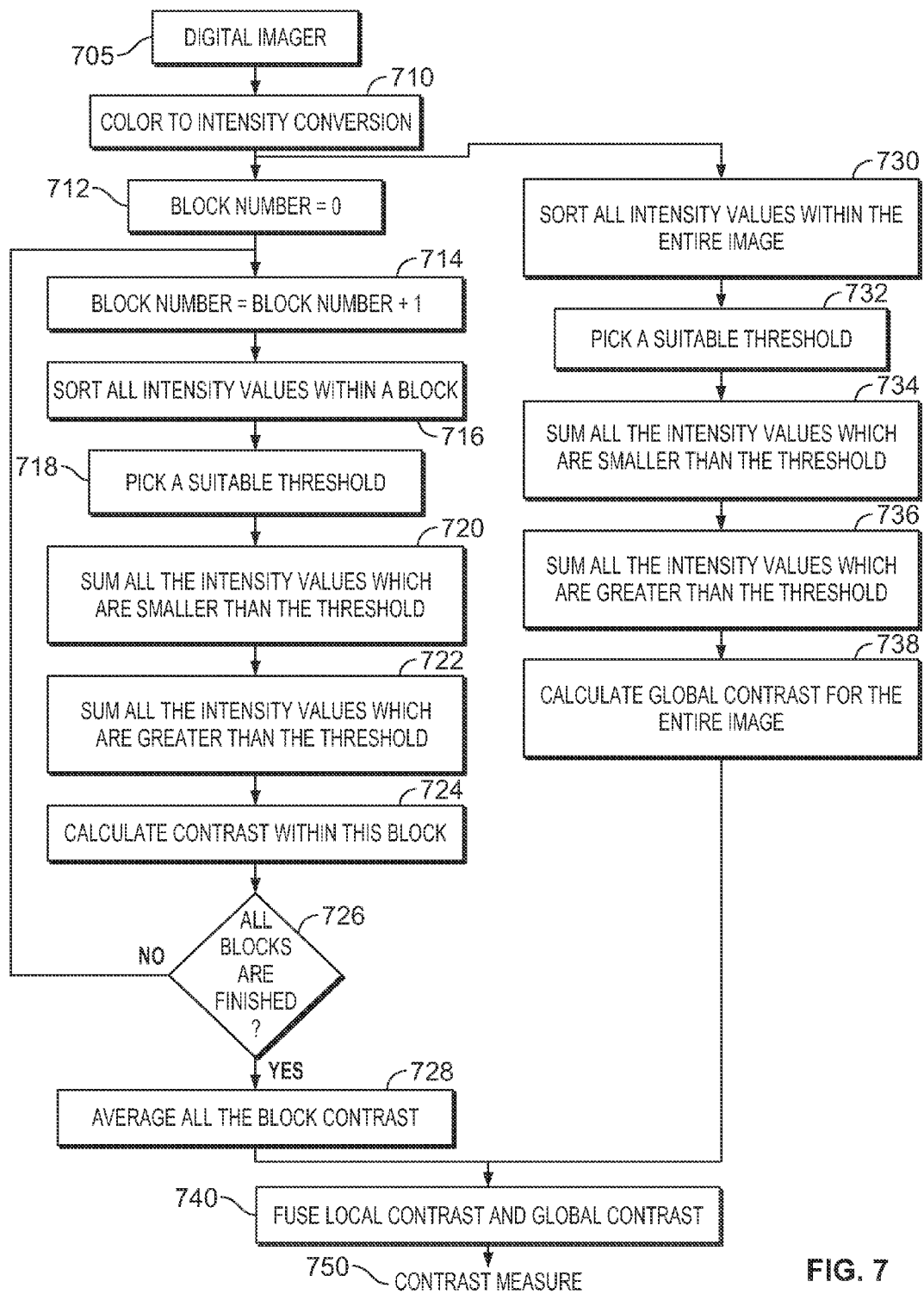
Figure 8:
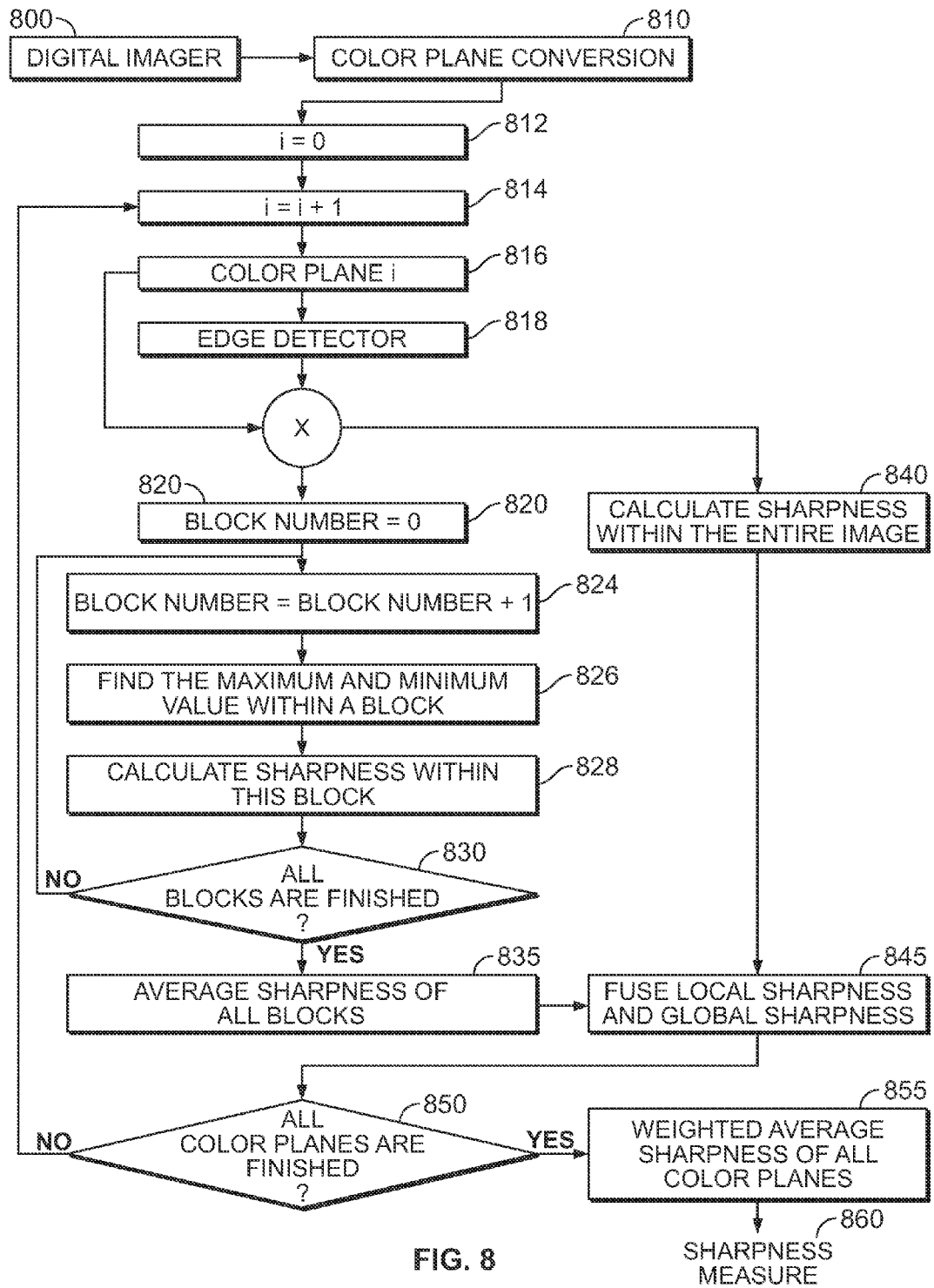
Figure 9:
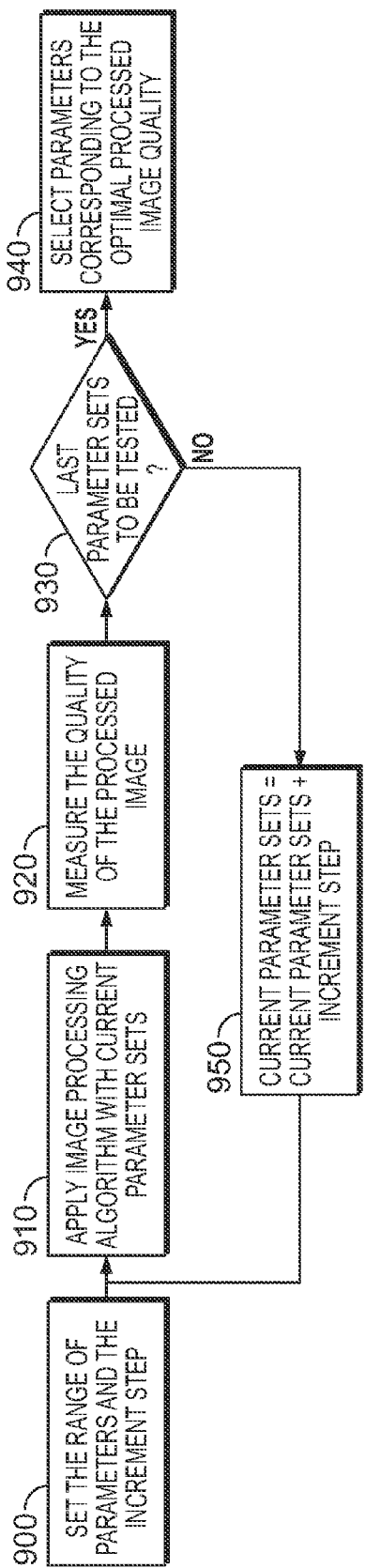
Figure 10:
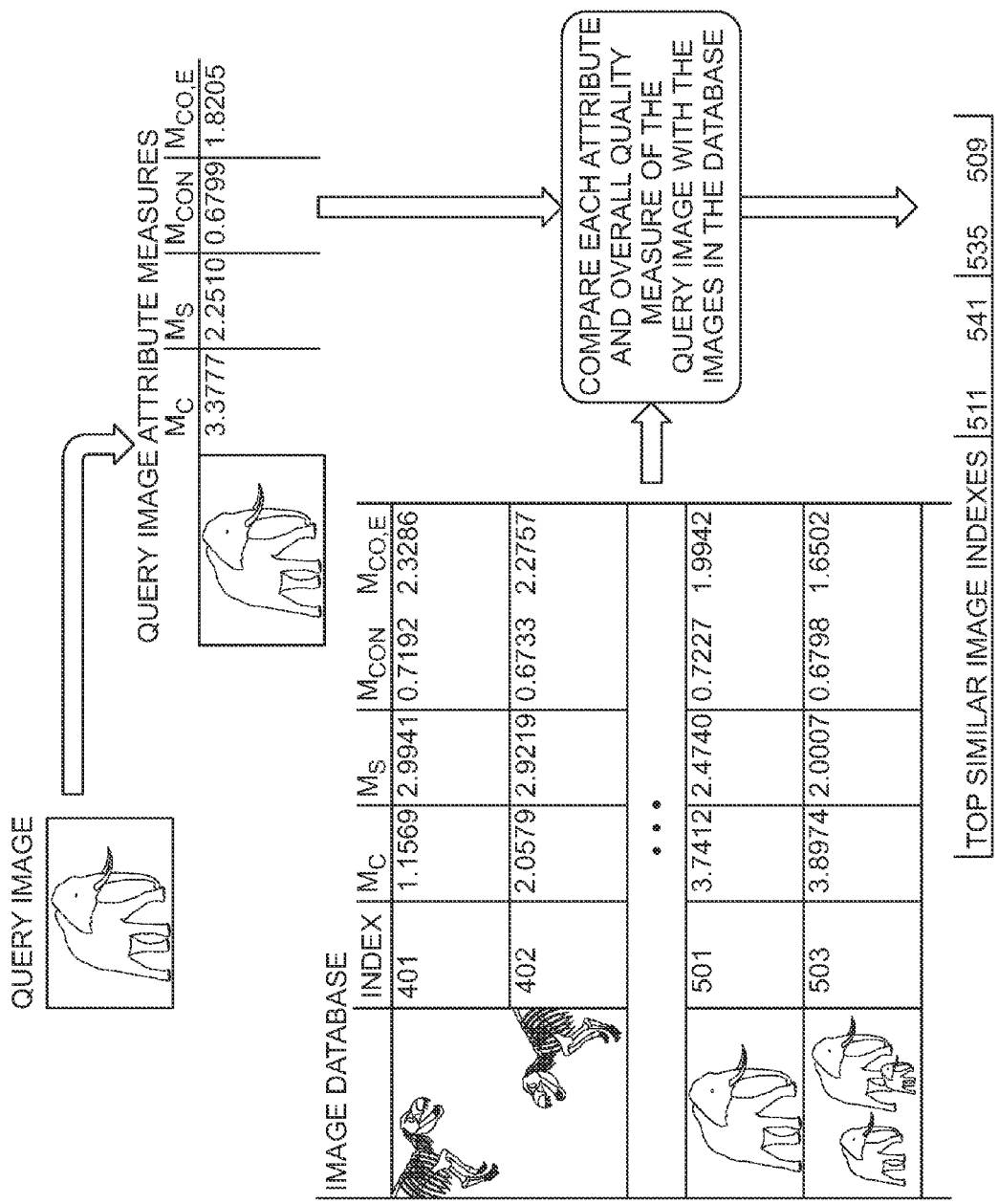

FIGS. 6A-B are flow charts of methods for measuring colorfulness of an image;

FIG. 7 is a flow chart of a method for measuring contrast of an image;

FIG. 8 is a flow chart of a method for measuring sharpness of an image;

FIG. 9 is a flow chart of a method for optimizing an image processing algorithm;

FIG. 10 is a flow chart of a method for searching for images based on an input image;

FIG. 11 depicts a method for assessing food quality based on image quality; and

FIG. 12 is a flow chart of a method for identifying a color matching that in an image for the painting industry.

Figure 13:
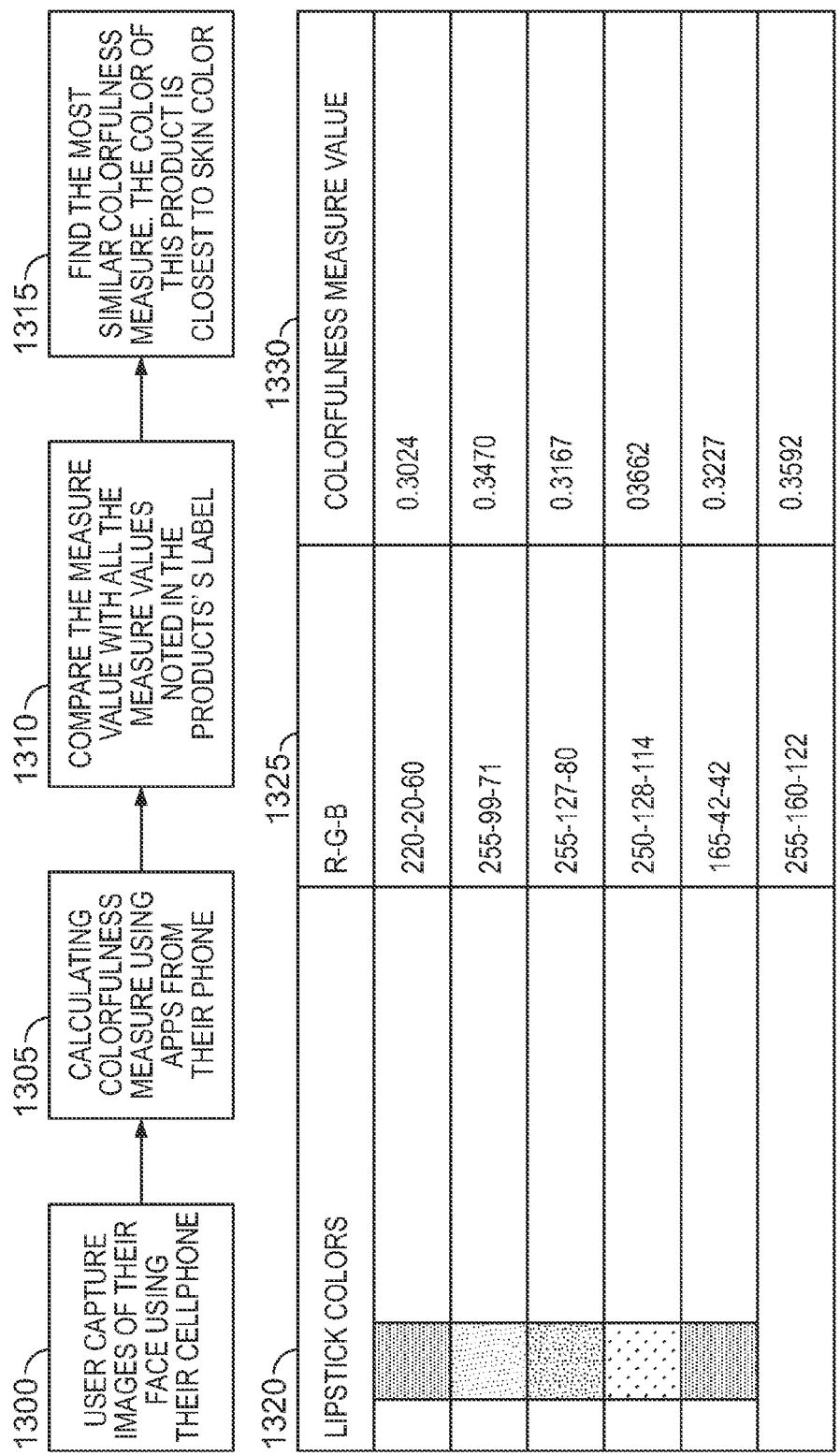

FIG. 13 is a flow chart of a method for identifying a color matching that in an image for the cosmetic industry.

Figure 14:
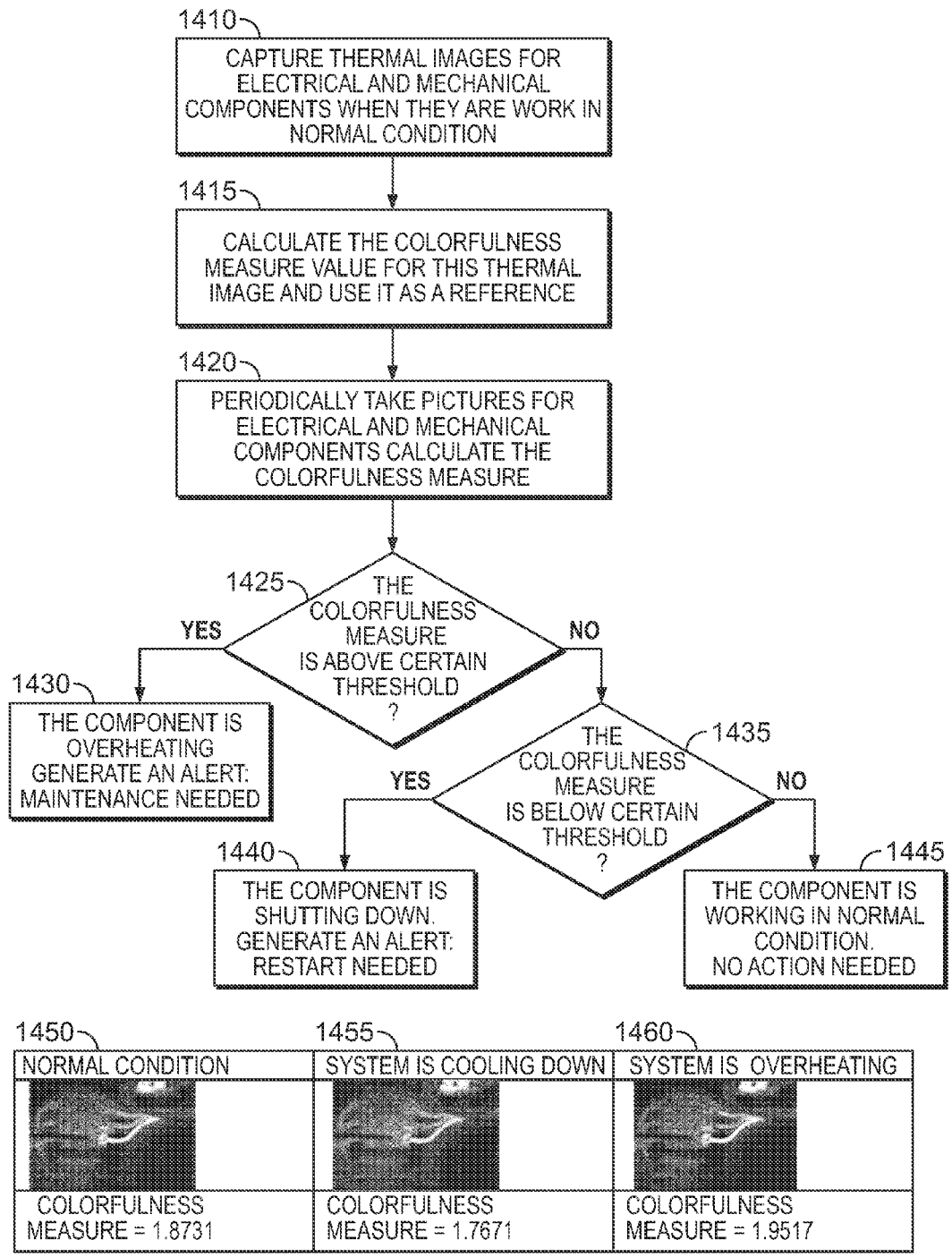

FIG. 14 is a flow chart of a method for the electrical and mechanical system inspection using colorfulness measure.

DETAILED DESCRIPTION

In the following description, numerous details are set forth for the purpose of explanation. However, one of ordinary skill in the art will realize that the implementations described herein may be practiced without the use of these specific details and that the implementations described herein may be modified, supplemented, or otherwise altered without departing from the scope of the invention.

Figure 1:
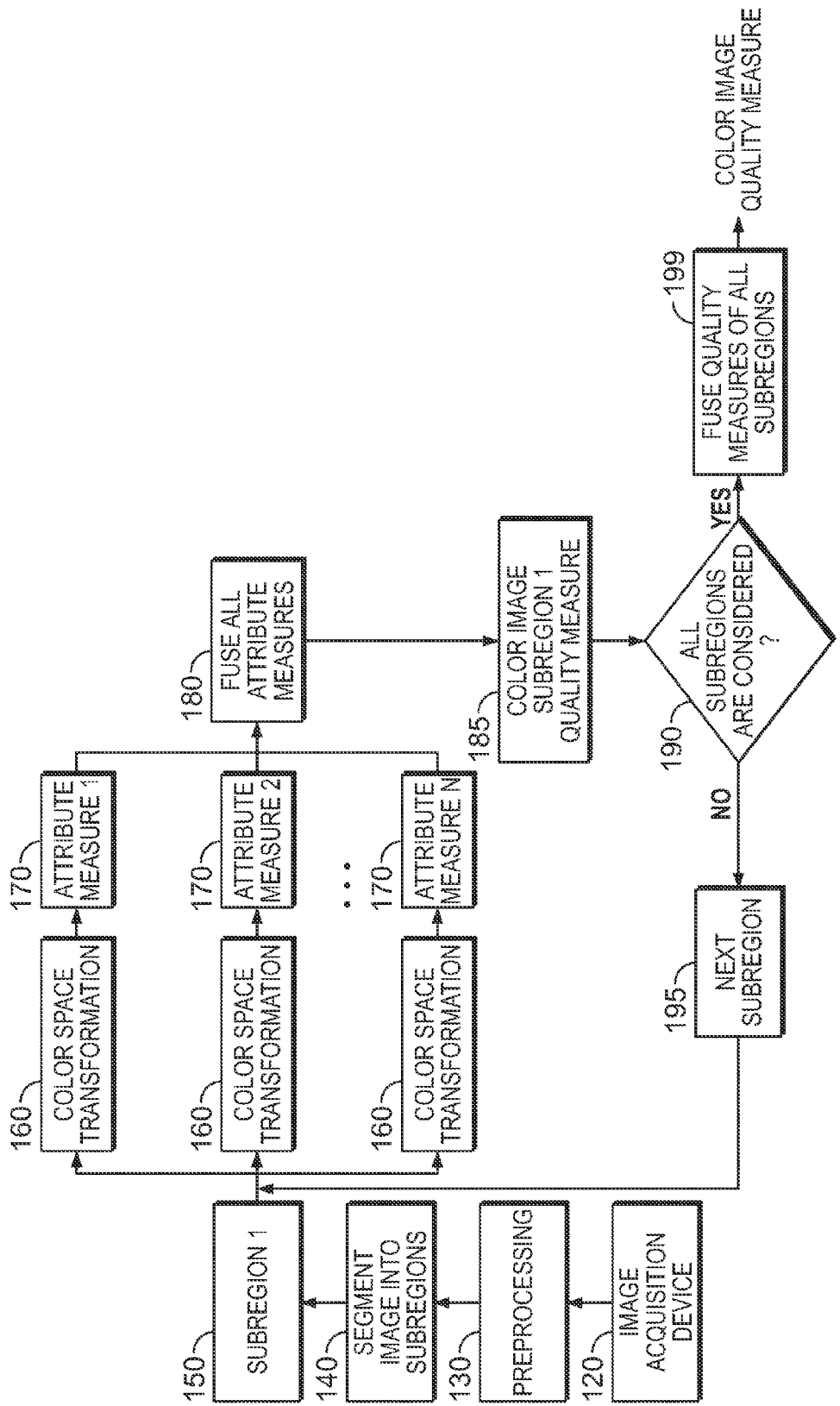
FIG. 1 is a block diagram of a system for measuring image quality.

FIG. 1 is an illustrative block diagram of an image quality measurement system. As depicted, the image quality measurement system first receives an image from an image acquisition device 120 such as a digital camera. In some implementations, there may be no image acquisition device 120, in which case the image may instead be received from a computer network such as the Internet, from a scanner, or from some other suitable source. The image is subjected to preprocessing 130. For example, the image quality measurement system may apply a predetermined color correction algorithm to the first image. In some implementations, no color correction algorithm is applied to the first image; in other implementations, the gray world algorithm, the white patch algorithm, the Naka-Rushton algorithm, or some other suitable color-correction algorithm is applied to the first image.

Figure 5:
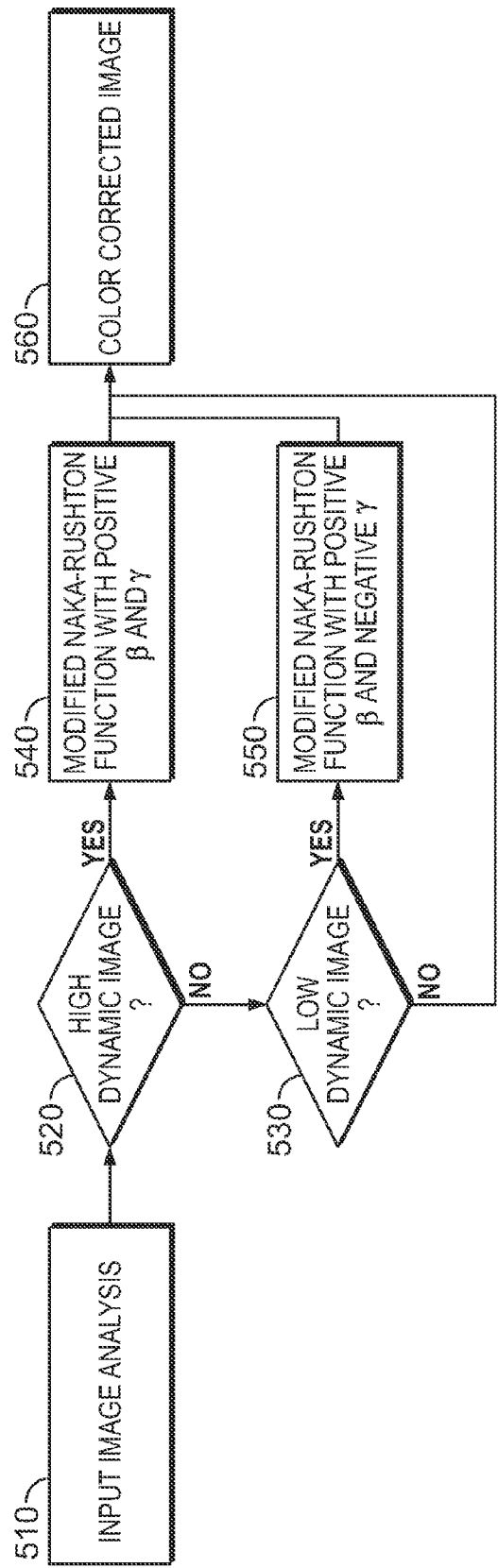
FIG. 5 is a flow chart of a method for correcting colors under different illumination conditions.

In some implementations, a modified Naka-Rushton algorithm, such as that depicted in the illustrative flow diagram of FIG. 5, may be applied to the first image to provide color correction. In such implementations, the algorithm first analyzes the distribution of pixel intensities in the image. As shown in FIG. 5, an image is input for analysis by an image processor at 510. A determination is made by the processor as to whether the input image has good contrast. At 520, the image processor determines whether the image is in the high dynamic range. If the pixel intensities are approximately equally distributed across the dynamic range of the image, the image may be considered to have good contrast and to require no adjustment; if the pixels are bimodally distributed, the image may be considered to have a high dynamic range. If it is not, a determination is made by the image processor if the image has low contrast at 530. If the pixels are approximately centered in the middle of the range of possible intensities, the image may be considered as having low contrast. Pixel intensities may then be modified based on an equation, such as:

$$V = \begin{cases} I\left(\frac{T+\beta H}{1+\beta H}\right)^{\gamma} & 0 < I \le T \\ (1-T)\left(\frac{I-T+\beta(1-H)}{1-T+\beta(1-H)}\right)^{\gamma} + T & T < I \le 1 \end{cases} \quad (1)$$

In particular, V represents the modified intensity of a pixel, I the original intensity of the pixel, T a threshold used to separate each pixel in the image into "dark" and "bright" regions, H an adaptation factor proportional to the pixel intensity, and β and γ parameters dependent on the intensity characteristics of the image. T is equal to (I–H). Adaptation factor H may be a function of the pixel intensity and the ratio of a pixel's intensity to the intensity of its surrounding pixels. His inversely proportional to the change in intensity of a pixel, much like the human vision system is more sensitive to changes in dark regions than in light regions. β may be a fixed parameter such as 1. In some implementations, the above equation may be applied to images that have neither a high dynamic range nor poor contrast, in which case β may have a different value, such as 3. If the image has low contrast, γ may be set equal to −1; otherwise, it may be set equal to 1. Thus, if a image is found to have high dynamic range, a modified Naka-Rushton function may be applied at 540. If the image is found to be a low contrast image, a modified Naka-Rushton function may be applied at 550. Following application of the modified Naka-Rushton function a color corrected image is obtained at 560. Equation 1 is merely illustrative, and the same algorithm may be implemented using an equation differing in whole or in part. For example, Equation 1 may remain the same, but T, H, β, and γ may be defined by applying the stochastic tunneling algorithm or another suitable global optimization algorithm to determine which parameter values maximize a non-reference image contrast measure. In such an example, the non-reference image contrast measure may be the measure of enhancement (EME), the measure of enhancement by entropy (EMEE), or some other suitable contrast measure.

Returning to FIG. 1, once the color-correction algorithm, if any, is applied to the first image, the image is submitted to an image processor configured to identify a set of regions or subregions 140 of the image based on predetermined characteristics of the image. The regions may be identified using an edge-detection algorithm, by splitting the image into a predetermined grid of blocks, or other suitable methods for segmenting an image. In some implementations, the set of regions includes only one region, which may be the image in its entirety. The regions may be designated as subregion1-n 150. For each region or subregion1-n, the image processor further generates a set of one or more color model representations of the region, which may include a representation in the RGB color space, the CIELAB color space, the HSV color space, the YCvCr color space, or some other suitable color space transformation 160. In some implementations, the color model representation of the input image is the only color model representation used. Once each region's color model representation has been generated, an attribute processor may identify and measure the attributes 170 for each region of the image in order to identify the overall image quality.

Figure 3:
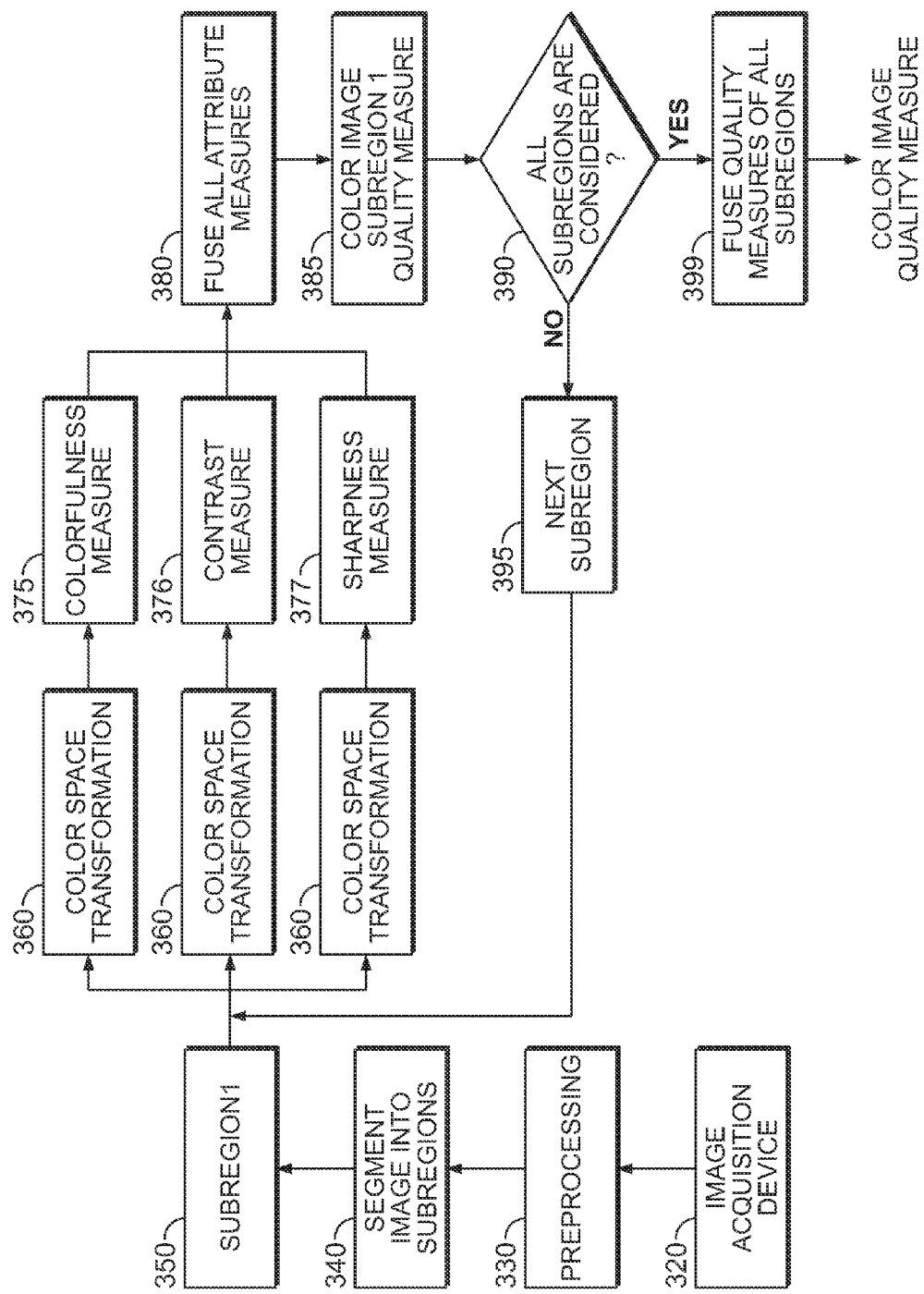
FIG. 3 is a block diagram of a system for measuring image quality.

To identify an attribute for a region of the image, the attribute processor calculates a regional image attribute based on at least one of the calculated color model representations. As suggested by FIG. 3, such regional image attributes may include colorfulness 375, contrast 376, and/or sharpness 377. Some implementations may also or alternatively use other regional attributes, such as measurements of the distribution of pixel intensities, measurements of the number of corners or edges in the region, or other suitable attributes.

Colorfulness of a region may represent the chrominance information perceived by a human viewer, and may be a function of one or more image statistics that are based on image attributes. Such image statistics may include one or more of the mean, the variance, the skewness, the kurtosis, or other statistics regarding each of the components of the corresponding color model representation. For images with low activities, such as synthetic images, the high order statistics might be very small. Therefore, additional terms for differentiate uni-colors are added. One illustrative example of such measure:

Unicolor colorfulness: (Namely, Logarithmic Unicolor Differentiation (LUD))

Convert a color $\{R, G, B\}$ image $I=\{I_{n,k}\}$, n=1, 2, ..., N; k=1, 2, ..., K $$R = [r_{n,k}]$$

$$R = \begin{cases} 1, & \text{if unicolor} \\ R_0 = \max_{n,k}[R_{n,k}], & \text{if image has rexture} \end{cases}$$

$$G = \begin{cases} 1, & \text{if unicolor} \\ G_0 = \max_{n,k}[G_{n,k}], & \text{if image has rexture} \end{cases}$$

$$B = \begin{cases} 1, & \text{if unicolor} \\ B_0 = \max_{n,k}[B_{n,k}], & \text{if image has rexture} \end{cases}$$

$$M = \max_{R_0,G_0,B_0} \left\{ R_0 = \max_{n,k}[R_{n,k}], G_0 = \max_{n,k}[G_{n,k}], B_0 = \max_{n,k}[B_{n,k}] \right\}$$

Definition 1 Pixel Colorfulness $$\text{Color}_{at\_pixel}(I_{n,k}) = \begin{cases} 0 & \text{if } (r_{n,k} \Box g_{n,k})^2 + (r_{n,k} \Box b_{n,k})(g_{n,k} \Box b_{n,k}) = 0 \\ \left| \frac{\alpha(r_{n,k} - g_{n,k}) + \beta(r_{n,k} - b_{n,k}) + \gamma(g_{n,k} - b_{n,k})}{\alpha(r_{n,k} + g_{n,k}) + \beta(r_{n,k} + b_{n,k}) + \gamma(g_{n,k} + b_{n,k})} \right| \end{cases}$$

Image (global unicolor) colorfulness is defined as a function of pixel colorfulness, for example $$\text{Colorful}(I) =$$

$$\frac{A}{\text{number of nonzeros}} \sum \text{Color}_{at\_pixel}(I_{n,k}) \log \text{Color}_{at\_pixel}(I_{n,k})$$

$$A =, 20, 50, 100$$

In some implementations, richness, activity, and color distribution are functions of colorfulness. FIGS. 6A-6B are illustrative flow diagrams depicting a colorfulness measurement process that may be used within the larger image quality measurement process of FIG. 1. Each component can be calculated under the same color model (as shown in FIG. 6A), or under different color model (as shown in FIG. 6B). Depending on given tasks, users are flexible to choose any combinations of image statistics and assign appropriate weighting coefficients for each term. For some practical applications, users can totally discard some components by assigning zero coefficients for these components in FIGS. 6A and 6B. As shown in FIGS. 6A and 6B, a digital imager 600 may perform a color space transformation at 610 using any appropriate transformation to obtain at colorfulness measure 650. The process may include analyzing color plane order statistics 672-680 and logarithmic unicolor differentiation 690, which may be fused at 661-663 to obtain the colorfulness measure 650.

Contrast in an image may represent the degree to which details of the image may be distinguished. Contrast may be calculated by generating a grayscale copy of the image, separating the grayscale copy into non-overlapping blocks, identifying two groups of pixels for each non-overlapping block, calculating, for each non-overlapping block, a local block contrast based on the two groups of pixels, and calculating the contrast image attribute as a function of the local block contrasts. In some such implementations, the non-overlapping blocks may be the same regions identified by the image processor; in other implementations, the non-overlapping blocks may be independently defined. The two groups of pixels in a non-overlapping block may be determined by a predetermined threshold, by the k-means clustering algorithm, or by some other suitable method. In some implementations, a global contrast may also be identified by calculating the contrast as above for a single non-overlapping block comprising the entire image, and a contrast measure for the image may be a function of both the global contrast and each local block contrast. FIG. 7 is an illustrative flow diagram depicting an exemplary contrast measurement process combining regional and global contrast measurements and may be used within the larger image quality measurement process of FIG. 1.

As shown in FIG. 7, a digital imager at 705 may convert color to intensity at 710 by assigning a local block number equal to 0 at 712, then for each consecutive block number +1, sorting intensity values within a block 716, and picking a suitable threshold 718. The intensity values that are smaller than the threshold are summed 720 and all of the intensity values that are greater than the threshold are summed 722 to calculate contrast within a respective block 724. This process continues at 726 until all of the blocks are finished at which point an average of all of the block contrast is obtained at 728. A global contrast may be obtained by sorting intensity values within the image at 730, then picking a suitable threshold at 732. Intensity values that are smaller than the threshold are summed 734 and intensity values that are greater than the threshold are summed 736 to calculate a global contrast for the image 738. The average block contrast 728 and the global contrast 738 are fused to obtain a local contrast and global contrast at 740 to yield a contrast measure 750.

Sharpness of an image may represent the amount of details in an image. In some implementations, the sharpness of a region may be calculated by: identifying each component of at least one color model representation of the region; identifying a plurality of component sets of edges, wherein each component set of edges corresponds to a component of the at least one color model representation; identifying an intensity of each identified edge pixel, wherein the edge pixel intensity is the intensity of the component in which the pixel is an edge pixel; and calculating the sharpness image attribute of the region based on the identified intensities of each edge pixel. In some implementations, a global sharpness may identified by calculating a sharpness as above for a single region comprising the entire image, and a sharpness measure for the image may be a function of both the global sharpness and each regional sharpness attribute. FIG. 8 is an illustrative flow diagram depicting an exemplary sharpness measurement process that combines regional and global sharpness measurements and may be used within the larger image quality measurement process of FIG. 1.

As shown in FIG. 8, a digital imager 800 performs a color plan conversion at 810 by setting for each i is set to 0 at 812 and incremented at 814 to obtain a color plane i at 816. Edges are detected at 818. This process is continued for all blocks beginning at block 0 at 820 and continuing to block 1 at 824 to find a maximum and minimum value within a block 826 and calculate sharpness within the block at 828. If all blocks are finished at 830, an average of all the blocks is obtained at 835. A global sharpness of the entire image is obtained at 840 and that is fused with the average sharpness of all blocks 835 to obtain a fused local sharpness and global sharpness at 845. When all color planes are finished at 850, a weighted average sharpness of all color plans is obtained 855 to yield a sharpness measure 860. The process may continue until all of the blocks are analyzed.

Once regional image attributes have been calculated for each region, the image processor may calculate image attributes based on the regional image attributes. An image attribute may be a function of the corresponding general set of regional image attributes, wherein a general set of regional image attributes may include regional image attributes corresponding to the same color model representation but to different regions. As an illustrative example, if colorfulness is calculated for each region based on the CIELAB color space, the overall colorfulness of the image may be based on the colorfulness of each identified region of the image. Finally, the image processor calculates an image quality of the image 185 as a function of each image attribute in the set of image attributes. The function used to calculate the image quality may be a linear function, a nonlinear function, a multi-scale function, or some other suitable function. The image quality analysis may continue at 190 if not all of the subregions of the image have been considered, but analyzing the next subregion n 195. Alternatively, if all of the subregions have been considered, the quality measures of the subregions, i.e. 185 may be fused at 199 to obtain a color image quality measure.

In some implementations, the image quality of a second image may be calculated in the same fashion that the image quality of the first image was calculated, and the two image qualities may be compared. If the second image is a different version of the first image, both images will have similar image qualities, and the difference between the image qualities will indicate the extent to which the second image is an enhancement or distortion of the first image. Such comparisons may be made when an original version and an altered version of the same image are provided to the image quality measurement system. In some implementations, such comparisons may be made between different versions of an image generated by an image processing system in order to compare image processing algorithms. A candidate image processing algorithm may be judged by comparing its output to the output of a control image processing algorithm. As an illustrative example, the first image may be produced by applying a first image processing algorithm to an image, and the second image by applying the candidate image processing algorithm to the same image. The candidate image processing algorithm may then be adopted if the image quality of the second image is greater than the image quality of the first. In some such implementations, the candidate image processing algorithm has different operating parameters but is otherwise the same as the image processing algorithm: such implementations may be used to adjust the operating parameters of an image processing algorithm. FIG. 9 is an illustrative flow diagram representing an exemplary image processing parameter optimization process for use in such an implementation.

As shown in FIG. 9, a range of parameters may be set at 900 including an increment step. An image processing algorithm is applied with the current parameter sets at 910. The quality of the processed image is measured at 920. All of the sets are tested. If it is determined at 930 that all of the sets are tested, parameters may be selected at 940 corresponding to an optimal processed image quality. If the sets are not all tested, the testing of sets continues at 950 with an incremental step.

Figure 2:
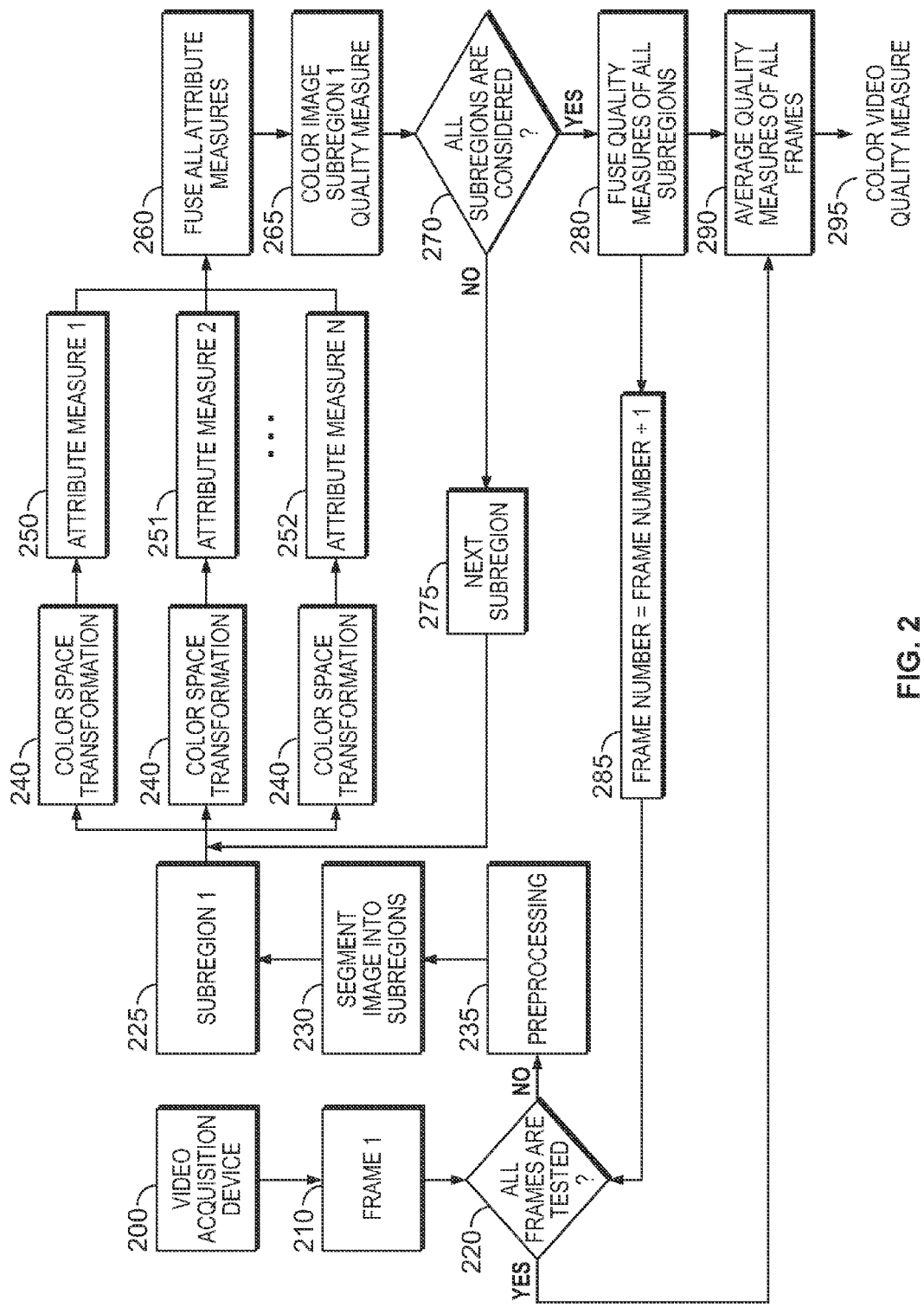
FIG. 2 is a block diagram of a system for measuring video quality.
Figure 4:
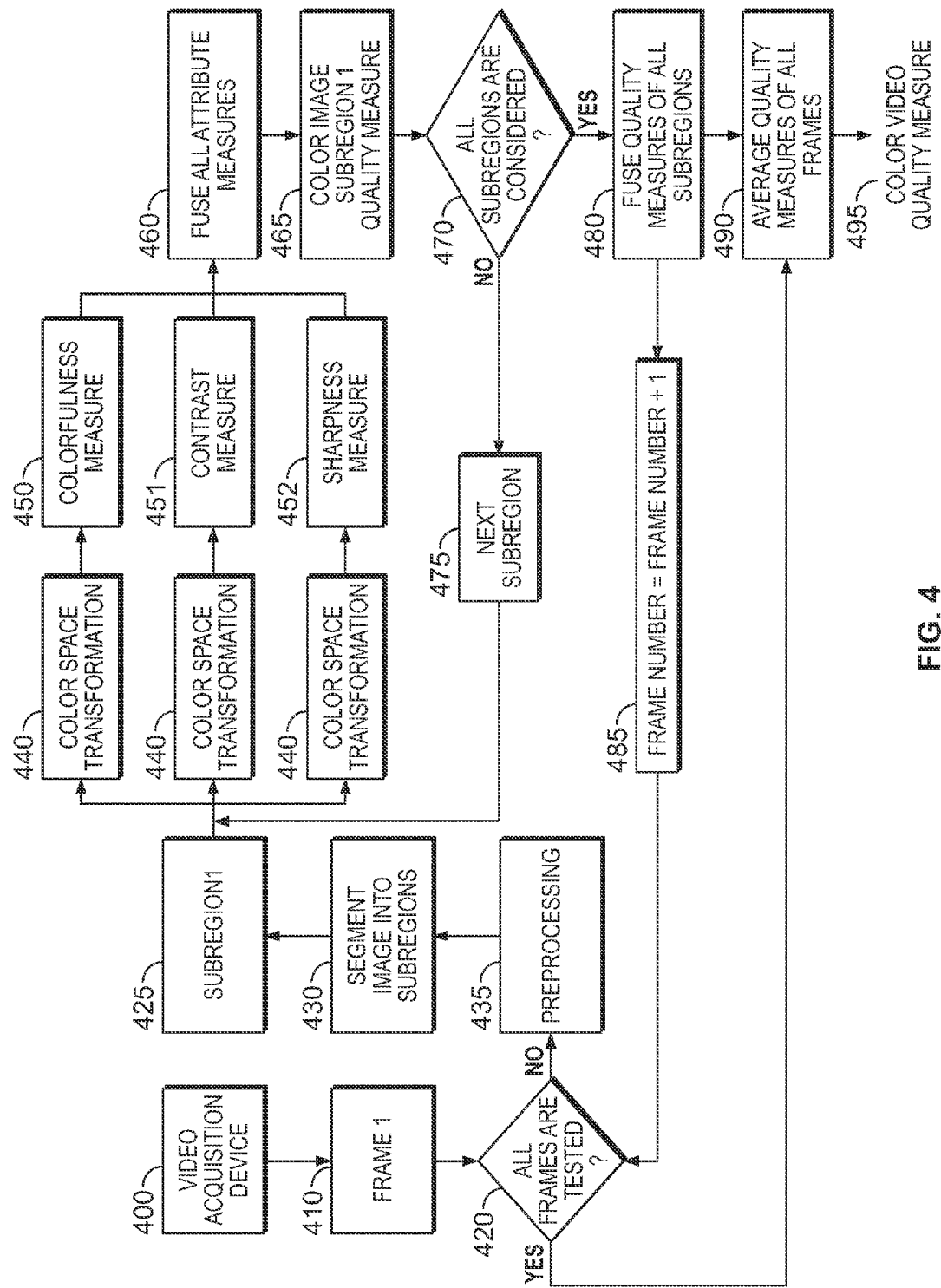
FIG. 4 is a block diagram of a system for measuring video quality.

In some implementations, as suggested in FIGS. 2 and 4, the image quality of a plurality of frames of a video may be assessed in the same fashion that the image quality of a single image may be assessed. In such implementations, an overall video quality may be calculated as a function of the image quality of each frame of the video, or of a representative selection of frames of the video. Such implementations may be used to compare video processing algorithms by applying different video-processing algorithms to the same video, calculating the video quality for the resulting versions of the video, and identifying the video-processing algorithm that generated the highest video quality value from the same underlying video. Some such comparison implementations may be used to compare processing algorithm parameters by using the same algorithm with varying parameters on the same video, and determining which parameters produce the highest video quality.

As shown in FIG. 2, a video acquisition device 200 obtains a video including a Frame 1 at 210. The frames are tested and continue at 220 including a preprocessing step 235, and segmenting the image into subregions 230. All of the subregions may be transformed for color space at 240 to obtain an attribute measure1-n 251-252. All of the attributes may be fused at 260 to obtain color image quality measure for a subregion at 265. The process continues until all of the subregions are considered at 270. The quality measures of the subregions are fused at 280. The frames are incremented by 1 at 285 until all of the frames are tested. Then, an average quality measure of all of the frames is obtained at 290 to yield a color video quality measure at 295.

FIG. 10 presents an illustrative example of an implementation in which image quality measurement is used to identify one or more images in a database. As depicted, images similar to an input image may be found by searching an image database for images with image quality and image attribute measurements similar to those of the input image. FIG. 12 depicts a similar implementation, in which the colorfulness attribute of an input image may be used to identify a color matching the input image. As shown in FIG. 12, a user may capture an image 1200. The image may be from home or some local environment and uploaded to a shop or painting website at 1210. A colorfulness measure is calculated as described herein at 1215 and the measure is compared to a database of measure values in a database 1220. A color index matching or most similar to the colorfulness measure is returned to the user at 1225.

FIG. 11 presents an illustrative example of an implementation in which an image quality measurement may be used to assess the quality of a product. As depicted, food of a known quality is imaged and at least one corresponding image attribute (such as colorfulness) is measured. The measured image attributes then correlate to food qualities of interest, allowing the generation of a lookup table. A system that takes a picture of a food item and compares the resulting image attribute measurements to the lookup table would then be able to estimate the quality of the imaged food. As shown in FIG. 11, in an offline embodiment, a user may take a picture of a product on an assembly line at 1100. Illumination of the image may be corrected at 1105. A computer simulation may be run calculating the quality measure of the product at 1110. A human expert may label the grade level of each product at 1115 and a system may be trained using a freshness table at 1120 based on the labeled grade levels. In another embodiment, a testing procedure may include taking a picture of each product on an assembly line at 1130. The images may be corrected for illumination at 1135. A computer simulation may be run to calculate a quality measure of the product in the picture at 1140. A comparison of the quality measure against the freshness table is made at 1145 to obtain a grade level of the product at 1150.

Embodiments described herein are applicable in any field where image quality and color measures are needed, such as color matching. In an online shopping system, customers can upload their captured images. A painting shop can find the most similar color from their inventory according to customer's uploaded images by comparing the image colorfulness similarity. For the cosmetic industry, a colorfulness measure can be assigned to each foundation or lipstick product. Users can take a picture of their own faces and lips, calculate the colorfulness using apps from their smartphone, and then choose the product with the most similar color. A system, method and apparatus for color matching may include applying a color correction module of the customer input image, computing the image colorfulness measure, comparing the colorfulness measure of the input image with all the color images in the database and selecting images with the most similar colorfulness measure as the best color matching image. This example is shown in FIG. 13.

As shown in FIG. 13, a user may capture an image of their face or some other face at 1300 using a cellphone or other image capturing device. The colorfulness measure of the image may be calculated at 1305 using the cellphone or other some device capable of communicating with the image capturing device. The colorfulness measure value may be compared with measured values for a product line or class at 1310 to obtain the most similar colorfulness measure at 1315. Some examples of color matching in the cosmetic industry are shown at 1320-1330.

Thermal images used in electrical and mechanical systems indicate the temperature of the electrical and mechanical component. When equipment overheats, the color in the thermal images may change. The colorfulness measure can tell when and where this overheating problem happens. A system, method, and apparatus for electrical and mechanical system inspection may include computing an image colorfulness measure on thermal images captured when the electrical or mechanical component work normally, periodically taking thermal images of the electrical or mechanical component, calculating the colorfulness of each image, generating an alert signal if the resultant colorfulness measure is above a certain threshold. If it is above a threshold, this implies the electrical or mechanical component is overheated. Alternatively, an alert may be generated if the resultant colorfulness measure is below a certain threshold. This implies the electrical or mechanical component is cooling down. Such an example is shown in FIG. 14.

As shown in FIG. 14, a thermal image of electrical and mechanical components in normal operation is captured at 1410. A colorfulness measure for the thermal image is obtained and stored as a reference value at 1415. Periodically, pictures are taken of the same electrical and mechanical components and the periodic colorfulness measure is calculated at 1420. The colorfulness measure may be compared to the reference value, or threshold value at 1425. Depending on the comparison, a component may be determined to have exceeded the threshold indicating that the components is overheating which may generate an alert that maintenance is needed at 1430. Alternatively, the comparison may indicate that the colorfulness measure is below the threshold at 1435 which may indicate that the component is shutting down and an alert may be generated that a restart is needed at 1440. In another scenario, the colorfulness measure may match the threshold in which case the component is operating normally and no action is needed at 1445. Some examples of such images are shown in 1450-1460.

Software and Hardware

The sensors described with reference to the systems and methods described herein can be of any suitable type, such as CCD imaging sensors, CMOS imaging sensors, or any analog or digital imaging sensor. The sensors may be responsive to electromagnetic radiation outside the visible spectrum, such as thermal, gamma, multi-spectral and x-ray sensors. The sensors, in combination with other components in the imaging system, may generate a file in any format, such as the raw data, GIF, JPEG, TIFF, PBM, PGM, PPM, EPSF, X11 bitmap, Utah Raster Toolkit RLE, PDS/VICAR, Sun Rasterfile, BMP, PCX, PNG, IRIS RGB, XPM, Targa, XWD, PostScript, and PM formats on workstations and terminals running the X11 Window System or any image file suitable for import into the data processing system. Additionally, the system may be employed for generating video images, such as digital video images in the .AVI, .WMV, .MOV, .RAM and .MPG formats.

The systems and methods described herein may be implemented in an image processor which may include microcontrollers and microprocessors programmed to receive data from the image sensor pixels and convert the data into an RGB value for display on a monitor. The image processors may be configured with hardware and software to perform one or more of the methods, and any combination of the one or more methods, described herein. The image processor may include a central processing unit (CPU), a memory, and an interconnect bus. The CPU may include a single microprocessor or a plurality of microprocessors for configuring the image processor as a multi-processor system. The memory may include a main memory and a read-only memory. The image processor may also include one or more mass storage devices, e.g., any of various disk drives, tape drives, FLASH drives, etc. The main memory can comprise dynamic random access memory (DRAM) and/or high-speed cache memory. In operation, the main memory stores at least portions of instructions and data for execution by a CPU.

The systems and methods may include a mass storage system, such as one or more magnetic disk or tape drives or optical disk drives, for storing data and instructions for use by the image processor. At least one component of the mass storage system, possibly in the form of a disk drive or tape drive, stores the database used for processing the signals measured from the image sensors. The mass storage system may also (or alternatively) include one or more drives for various portable media, such as a floppy disk, a compact disc read-only memory (CD-ROM), DVD, or an integrated circuit non-volatile memory adapter (i.e. PC-MCIA adapter) to input and output data and code to and from the image processor.

The image processor may also include one or more input/output interfaces for data communications. The data interface may be a modem, a network card, serial port, bus adapter, or any other suitable data communications mechanism for communicating with one or more local or remote systems. The data interface may provide a relatively high-speed link to a network, such as the Internet. The communication link to the network may be, for example, optical, wired, or wireless (e.g., via satellite or cellular network). Alternatively, the image processor may include a mainframe or other type of host computer system capable of communicating via the network.

The image processor may also include suitable input/output ports or use the interconnect bus for interconnection with other components, a local display, and keyboard or other local user interface for programming and/or data retrieval purposes.

In certain embodiments, the image processor includes circuitry for an analog-to-digital converter and/or a digital-to-analog converter. In such embodiments, the analog-to-digital converter circuitry converts analog signals received at the sensors to digital signals for further processing by the image processor.

Certain components of the image processor are those typically found in imaging systems used for portable use as well as fixed use. In certain embodiments, the image processor may be a general purpose computer system, e.g., of the types used as servers, workstations, personal computers, network terminals, and the like. Certain aspects of the systems and methods described herein may relate to the software elements, such as the executable code and database for the server functions of the image processor.

Generally, the methods and techniques described herein may be executed on a conventional data processing platform such as an IBM PC-compatible computer running the Windows operating systems, a SUN workstation running a UNIX operating system or another equivalent personal computer or workstation. Alternatively, the data processing system may comprise a dedicated processing system that includes an embedded programmable data processing unit.

Certain embodiments of the systems and processes described herein may also be realized as software component operating on a conventional data processing system such as a UNIX workstation. In such embodiments, the processes may be implemented as a computer program written in any of several languages well-known to those of ordinary skill in the art, such as (but not limited to) C, C++, FORTRAN, or Java. The processes may also be executed on commonly available clusters of processors, such as Western Scientific Linux clusters, which may allow parallel execution of all or some of the steps in the process.

Certain embodiments of the methods described herein may be performed in either hardware, software, or any combination thereof, as those terms are currently known in the art. In particular, these methods may be carried out by software, firmware, or microcode operating on a computer or computers of any type, including pre-existing or already-installed image processing facilities capable of supporting any or all of the processor's functions. Additionally, software embodying these methods may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among devices connected to the Internet. Accordingly, these methods and systems are not limited to any particular platform, unless specifically stated otherwise in the present disclosure.

The systems described herein may include additional electronic, electrical and optical hardware and software elements for capturing images without departing from the scope of the systems and methods described herein. For example, the system may include single-shot systems, which in turn, may include one or more color filters coupled with the imaging sensors (e.g., CCD or CMOS). In another embodiment, the system includes multi-shot systems in which the sensor may be exposed to light from a scene in a sequence of three or more openings of the lens aperture. In such embodiments, one or more imaging sensors may be combined with one or more filters passed in front of the sensor in sequence to obtain the additive color information. In other embodiments, the systems described herein may be combined with computer systems for operating the lenses and/or sensors and processing captured images.

Those skilled in the art will know or be able to ascertain using no more than routine experimentation, many equivalents to the embodiments and practices described herein. Variations, modifications, and other implementations of what is described may be employed without departing from the spirit and scope of the present disclosure. More specifically, any of the method, system and device features described above or incorporated by reference may be combined with any other suitable method, system or device features disclosed herein or incorporated by reference, and is within the scope of the present disclosure. The systems and methods may be embodied in other specific forms without departing from the spirit or essential characteristics thereof. The foregoing embodiments are therefore to be considered in all respects illustrative, rather than limiting of the present disclosure. The teachings of all references cited herein are hereby incorporated by reference in their entirety.

It will be apparent to those of ordinary skill in the art that methods involved in the present invention may be embodied in a computer program product that includes a computer-usable and/or -readable medium. For example, such a computer-usable medium may comprise a read-only memory device, such as a CD-ROM disk, conventional ROM devices, or a random access memory, a hard drive device or a computer diskette, a flash memory, a DVD, or any like digital memory medium, having a computer readable program code stored thereon.

Persons skilled in the art will appreciate that features of the various configurations described herein may be combined or separated without departing from the present invention. As an illustrative example, a system may measure only one of the colorfulness, sharpness, and contrast of images. It will also be recognized that the invention may take many forms other than those disclosed in this specification. As illustrative examples, a system designed to compare the sharpness of images with similar content may make a sharpness calculation based on the results of measurements of a training set of images with the same or similar content and predetermined types and amounts of distortion; a system designed to compare the sharpness of images with different content may make a sharpness calculation based on the results of measurements of a training set of images with varying content and varying types and amounts of distortion; and a system may calculate colorfulness, sharpness, and contrast measures in parallel. Accordingly, it is emphasized that the invention is not limited to the disclosed methods, systems and apparatuses, but is intended to include variations to and modifications thereof as understood by those skilled in the art with respect to the following embodiments.

Additional illustrative features, methods, systems, and devices of the disclosure are described in the following references, which are hereby incorporated by reference. These references include outlines of certain aspects of the invention, "No Reference Color Image Quality Measures," by C. Gao, K. Panetta, and S. Agaian, "Color Image Attribute and Quality Measurements," by K. Panetta, C. Gao, and S. Agaian, and a further explanation of an illustrative modified Naka-Rushton formula.

We claim:

1. A system for measuring image quality, comprising:
   an image processor for:
   identifying a set of regions of the image based on predetermined characteristics of the image,
   generating a set of color model representations of each region in the set of regions,
   calculating, for each region in the set of regions, a regional set of regional image attributes, wherein each regional image attribute is based on at least one color model representation in the set of color model representations, and
   calculating a set of image attributes, wherein each image attribute is based on a corresponding general set of regional image attributes, wherein a general set of regional image attributes includes regional image attributes corresponding to the same color model representation but to different regions.

2. The system of claim 1, wherein the set of regional image attributes comprises one of the group of: colorfulness, sharpness and contrast; and wherein the set of image attributes are calculated based on a model.

3. The system of claim 1, wherein the model is based on a training set of images comprising a plurality of images subject to predetermined levels of distortions.

4. The system of claim 1, wherein the image processor is further configured for:
   identifying each component of at least one color model representation of the region;
   identifying a plurality of component sets of edges, wherein each component set of edges corresponds to a component of the at least one color model representation;
   identifying an intensity of each pixel in each component set of edges, wherein the intensity of an edge pixel is the intensity of the component in which the pixel is an edge pixel; and
   calculating the sharpness image attribute of the region based on the identified intensities of each pixel in each component set of edges.

5. The system of claim 1, wherein the image processor is further configured for:
   identifying each component of at least one color model representation of the region;
   identifying a plurality of component sets of corners, wherein each component set of corners corresponds to a component of the at least one color model representation;
   identifying an intensity of each pixel in each component set of corners, wherein the intensity of a corner pixel is the intensity of the component in which the pixel is a corner pixel; and
   calculating the sharpness image attribute of the region based on the identified intensities of each pixel in each component set of corners.

6. The system of claim 1, wherein the image processor is further configured for:
   generating a grayscale copy of the image;
   separating the grayscale copy into non-overlapping blocks;
   identifying, for each non-overlapping block, two groups of pixels;
   calculating, for each non-overlapping block, a local block contrast based on the two groups of pixels; and
   calculating the contrast image attribute as a function of the local block contrasts.

7. The system of claim 1, wherein the image processor is further configured for:
applying a candidate image processing algorithm to the first image to generate the second image;
determining whether the image quality of the second image is higher than the image quality of the first image; and
in response to determining that the second image has a higher image quality than the first image, accepting the candidate image processing algorithm.

8. The system of claim 1, further comprising an image preprocessor for applying a predetermined color-correction algorithm to an image, wherein the color-correction algorithm comprises one of the group of: gray world algorithm, white patch algorithm, and Naka-Rushton algorithm.

9. The system of claim 1, further comprising calculating an image quality of the first image as a function of each regional image attribute in the set of regional image attributes.

10. The system of claim 9, wherein the function calculating image quality comprises one of the group of: a linear function, a nonlinear function, a multiscale function, and a comparison with an image quality of a second image.

\* \* \* \* \*